July 9, 1940.  L. F. DELGADO  2,207,480

TAPER MEASURING CALIPER

Filed June 1, 1938

INVENTOR.
LUIS F. DELGADO
BY
*Victor J. Evans & Co.*
ATTORNEY.

Patented July 9, 1940

2,207,480

UNITED STATES PATENT OFFICE 2,207,480

TAPER MEASURING CALIPER

Luis F. Delgado, Copper Creek, Ariz.

Application June 1, 1938, Serial No. 211,274

3 Claims. (Cl. 33—174)

This invention relates to calipers and more particularly to a taper measuring caliper.

An object of the invention is to provide a simple, practical and inexpensive device of the character described.

Another object is to provide an improved taper measuring caliper.

Figure 1:
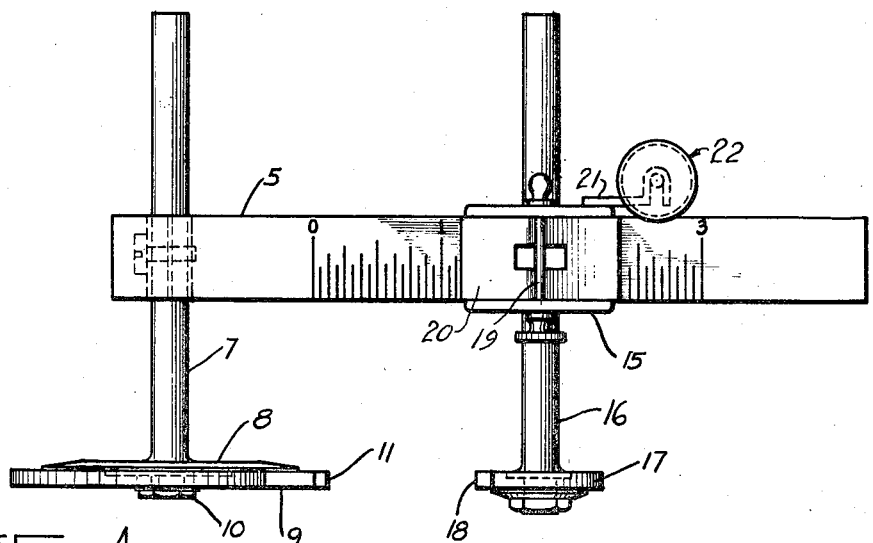
Figure 2:
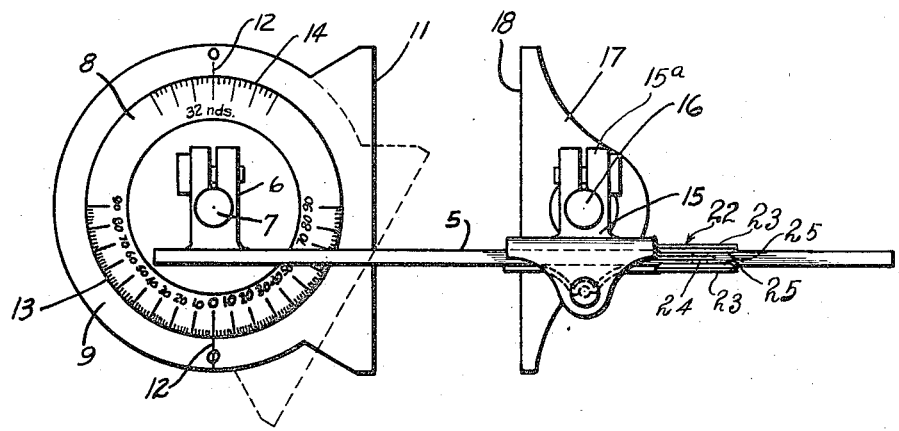

Other objects and advantages will appear and be brought out more fully in the following specification, reference being had to the accompanying drawing wherein Fig. 1 is a side view of a caliper embodying my invention and Fig. 2 is a top view of the same.

Referring more particularly to the drawing, I show a caliper having a bar member 5 provided with a clamp bracket 6 in which is adjustably mounted a rod 7 to the lower end of which is integrally secured a disc 8. A calipering plate 9 is secured to an extension of rod 7 adjacent disc 8 and held by a suitable lock bolt 10 or the like. Plate 9 has a straight edge portion 11 and one or more index markers 12. Disc 8 is provided with a series of graduations 13 measuring degrees and a series of graduations 14 measuring in thirty-seconds, each graduation indicating a taper of one thirty-second of an inch per inch. A slide bracket 15 is slideably mounted on bar 5 and has a clamp bracket 15a which adjustably secures a rod 16, to the lower end of which is suitably secured a gauge member 17 having a calipering straight edge 18. A pin 19 secures a flat spring member 20 to bracket 15 whereby the latter is resiliently pressed against the face of bar 5 and is slidable therealong with some degree of friction. A member 21 secured to bracket 15 serves as a guide for a slide operator 22 which consists of a pair of disc members 23 secured together by a spindle 24, the latter being rotatable in member 21. Discs 23 have their interior faces tapered such that the discs are thicker nearer the center than at the peripheral portions thereof and the edge portions may be knurled if desired. By this construction a fine adjustment of the bracket 15 can be made after a preliminary setting by pressing down on operator 22 causing the face 25 to engage the edges of bar 5 and slightly rolling operator 22 by the thumb.

From the above description, it will be apparent that the outside taper per inch of keys, axles, shafts, pins, cones and the like can easily be measured, the plate 9 being adapted to turn to fit the taper of the article measured and the taper in thirty-seconds of an inch per inch read directly from scale 14 as shown by the dotted position of the plate in Fig. 2.

Having described my invention what I claim is:

1. A taper measuring caliper as described, comprising a bar, a transverse rod longitudinally adjustably supported adjacent one end of said bar, a calipering plate secured to the outer end of said rod, a taper gauge plate co-operating with the calipering plate and adjustably supported by the rod, a slide bracket longitudinally adjustably supported by said bar, a transverse bar longitudinally supported in said slide bracket, and a gauge plate adjustably supported by the outer end of said rod.

2. A taper measuring caliper as described, comprising an elongated bar having a scale marked thereon, a transverse rod longitudinally adjustably supported adjacent one end of said bar, a calipering plate on said rod adjacent its outer end and having taper indicia thereon, a gauge plate adjustably carried by the rod and having a pointer co-operating with the taper indicia, a slide bracket longitudinally adjustably supported on said bar, a rod transversely mounted in said bracket and longitudinally adjustable, and a gauge plate carried by the outer end of said rod.

3. A taper measuring caliper as described, comprising an elongated bar having a scale marked thereon, a transverse rod longitudinally and rotatably supported by said bar adjacent one end, a calipering plate rigidly supported by said rod, a gauge plate mounted on the rod, means for locking the gauge plate to the calipering plate, a slide bracket longitudinally adjustably supported by said bar, a transverse rod longitudinally and rotatably supported in said bracket, and a gauge plate rigidly carried by the outer end of said rod.

LUIS F. DELGADO.